United States Patent [19]

Cordani

[11] 4,091,742

[45] May 30, 1978

[54] STACKED CONTAINER WELL HOLE GONDOLA CAR

[76] Inventor: Eugene J. Cordani, 1800 St. Denis Ct., Florissant, Mo. 63033

[21] Appl. No.: 709,251

[22] Filed: Jul. 28, 1976

[51] Int. Cl.$^2$ .......................... B60P 7/10; B61D 3/08; B61D 3/16; B65J 1/22

[52] U.S. Cl. ................................ 105/366 D; 105/376; 105/406 R; 105/418; 105/463; 105/489

[58] Field of Search ........... 105/366 C, 366 D, 366 E, 105/366 R, 367, 374, 376, 385, 386, 406 R, 406 A, 410, 489, 418, 419, 463

[56] References Cited

U.S. PATENT DOCUMENTS

| | | | |
|---|---|---|---|
| 2,449,491 | 9/1948 | Liebegott | 105/489 |
| 2,925,792 | 2/1960 | Fraenkel | 105/366 R |
| 3,079,874 | 3/1963 | Hansen et al. | 105/367 |
| 3,319,583 | 5/1967 | Gutridge | 105/366 R |
| 3,357,371 | 12/1967 | Gutridge | 105/366 R |
| 3,389,663 | 6/1968 | Gutridge | 105/366 R |
| 3,410,227 | 11/1968 | Gutridge | 105/366 R |
| 3,520,526 | 7/1970 | Gutridge | 105/376 X |
| 3,561,369 | 2/1971 | D'Leary | 105/366 D |
| 3,577,933 | 5/1971 | Ferris et al. | 105/366 D |
| 3,818,843 | 6/1974 | Lee | 105/366 R |

*Primary Examiner*—Drayton E. Hoffman
*Assistant Examiner*—Howard Beltran

[57] ABSTRACT

A container car is provided having a depressed center section for carrying bulk lading such as stacked containers. Transverse bulkheads at opposite ends of the car maintain bulk lading from moving longitudinally relative to the car. Side sills are provided on each side of the car of simple design which is easy to fabricate and assemble. The transverse bulkheads include supports which transfer lading loads from the upper portion of the bulkhead down into the side sill and into the end portion of the car, and also transmit longitudinal impact and squeeze loads between the end portion of the car and the side sills in the center section.

23 Claims, 6 Drawing Figures

STACKED CONTAINER WELL HOLE GONDOLA CAR

BACKGROUND OF THE INVENTION

U.S. Pat. Nos. 3,319,583; 3,410,227; 3,520,256 and 3,561,369 disclose railway cars for carrying stacked containers having a depressed center section and truss type sides. The truss type sides include upper and lower longitudinals joined by vertical and diagonal members. Lower containers are held in place by transverse bulkheads. Upper containers stacked on the lower containers are held in place with locking members which engage the upper containers. In U.S. Pat. No. 3,818,843 cylindrical containers are carried in a car also having a depressed center section. The sides are composed of upper and lower longitudinals with latches used to hold the cylinders in place. U.S. Pat. No. 3,389,663 discloses a car having a depressed center section through half of the car in which one container is stacked on the other, with the upper container held in place with latches. In the other half of the car a single container is carried which extends outwardly beyond the truck. In U.S. Pat. No. 3,357,371 a container well car is described for carrying stacked containers having relatively short sides in which the upper containers are maintained in place by cooperating locks on the upper and lower containers.

It would be desirable to provide a container car having a depressed center section for carrying stacked containers with short side sills of simple design to minimize fabrication costs and a transverse bulkhead to hold the lower and upper containers in place.

SUMMARY OF THE INVENTION

In accordance with the present invention a railway car is provided having a depressed center section for carrying bulk lading such as stacked containers. Transverse bulkheads at opposite ends of the car prevent bulk lading from moving longitudinally relative to the car. Side sills are provided on each side of the car of simple design which is inexpensive to fabricate and assemble. The transverse bulkheads include bulkhead supports comprising a pair of diagonals located on each side of the car attached to the upper portion of the transverse bulkhead and to the side sill on either side of the bulkhead. A transverse plate is attached to the upper portion of the transverse bulkhead and to a shear plate at the end of the car. The bulkhead supports transfer lading loads from the upper portion of the bulkhead down into the side sills and also transfer longitudinal impact and squeeze loads between the end portion of the car and the side sills in the center section. The side sills comprise a channel section having longitudinally spaced, transversely extending gussets.

THE DRAWINGS

DESCRIPTION OF PREFERRED EMBODIMENT

Figure 3:
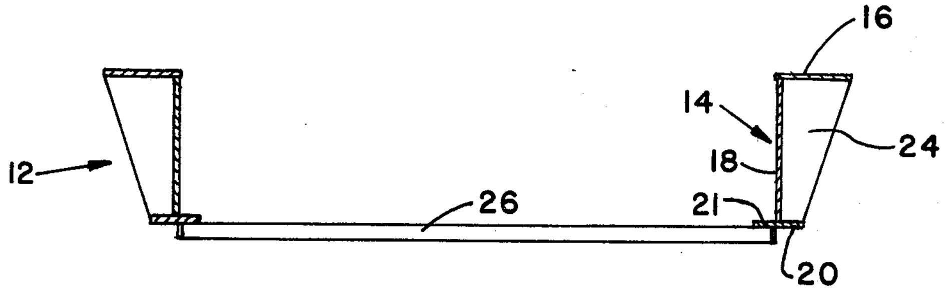
FIG. 3 is a sectional view looking in the direction of the arrows along the line 3—3 in FIG. 2.

The container car of the present invention is indicated in the drawings at 10. The car includes side sills 12 located on each side of the car. The side sills 12 include a channel member 14 having an upper flange 16, a vertical web 18, and a lower flange 20 (FIG. 3). Side sill 14 further includes a longitudinally spaced gussets 22 and 24. Gussets 22 and 24 are located along the side sill at the places where transverse channel members 26 join the side sill. In addition a diagonally extending channel member 28 also joins the side sill places where gussets 22 and 24 are located. Transverse member 26 and diagonal 28 maintain the car square in the center section and prevent any longitudinal movement of one side sill relative to the other side sill.

At each end of the car inward of the trucks a transverse bulkhead structure indicated generally at 30 is provided.

The bulkhead 30 includes a transverse plate 32 which is welded to the side sills 12 on opposite sides of the car. Vertically extending beams 34 of channel cross section are welded on either end of the plate 32 which extend from the side sill flange 16 to the top of plate 32. Lower container support plates 40 are welded to transverse plate 32 and the inner ends 21 of lower flange 20. In addition angles 35 are welded to plate 32 and channel 34. An upper inclined transverse plate 36 having longitudinal end portions 38 is provided to facilitate lowering the containers into place. Angles 35 hold the upper containers in place and prevent longitudinal and lateral movement of these containers relative to the car.

Figure 4:
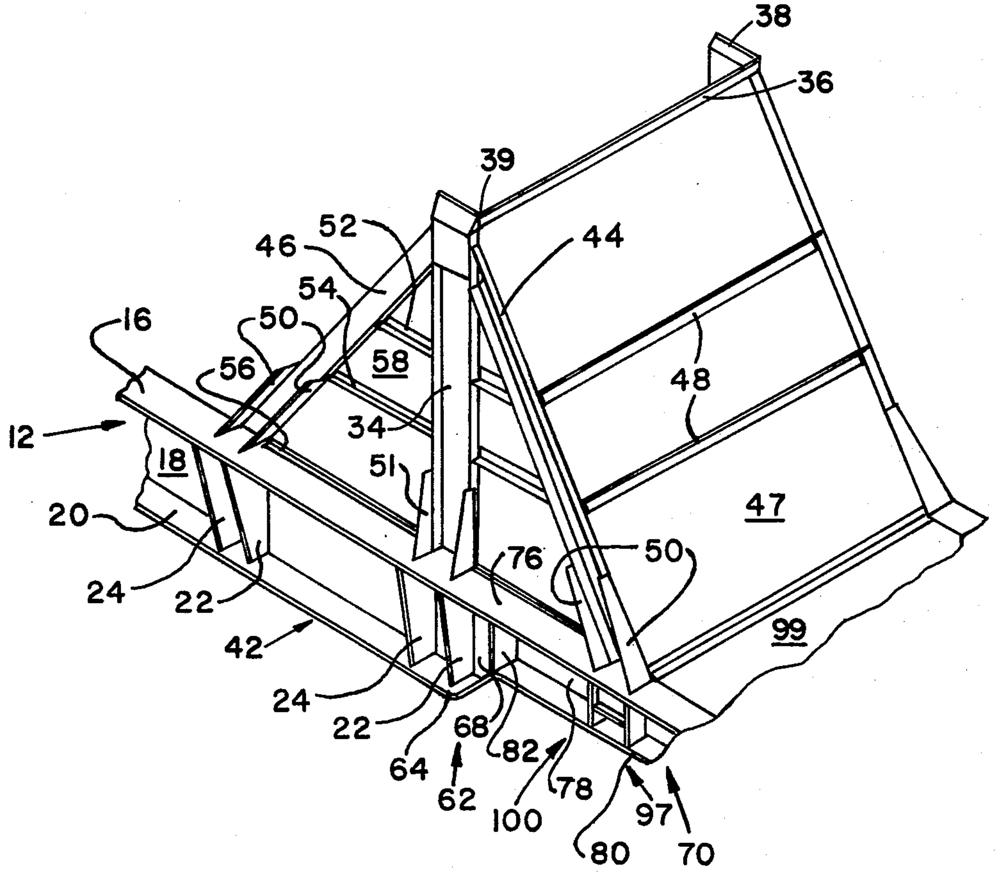
FIG. 4 is an enlarged perspective view of the transverse bulkhead and longitudinal diagonals of the present invention.
Figure 6:
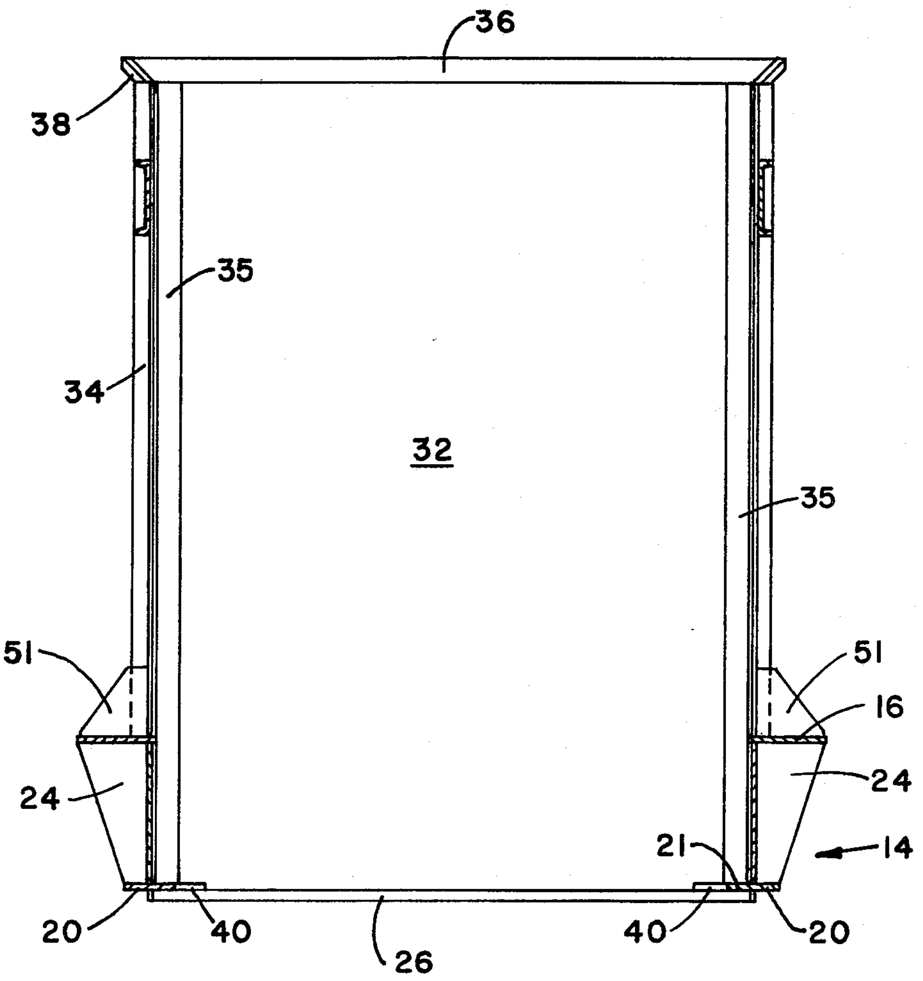
FIG. 6 is a sectional view looking in the direction of the arrows along the line 6—6 in FIG. 1.

For transmitting container loads from the upper portion of bulkhead 30 downwardly into the side sills and for transferring longitudinal impact loads between the end portion of the car and the side sills 12 bulkhead reinforcing structure indicated generally at 42 (FIG. 4) is provided. Bulkhead reinforcing structure 42 includes a pair of longitudinally extending channel shaped diagonals 44 and 46 attached to the side sills 12 and the upper portion 39 of transverse bulkhead 32. In addition, a transversely extending plate 47 is welded to diagonals 44 on either side of the car, to transverse plate 32 and to end shear plate 99 (described hereinafter). Reinforcing angles 48 may be welded to plate 47. Lower reinforcing gussets 50 and 51 may also be provided to reinforce diagonals 44 and 46, and channel beams 34. A plurality of longitudinally extending angles 52, 54, and 56 may also be provided, vertically spaced extending between diagonals 44 and 46 and spaced between vertical channel member 34. In addition one or more longitudinally extending webs 58 may also be utilized to connect diagonals 44 and 46 with beams 34.

Side sill 21 includes a transition section 62 in which lower flange 20 is inclined upwardly as indicated at 64. Web portion 18 is also foreshortened as indicated at 68.

Figure 1:
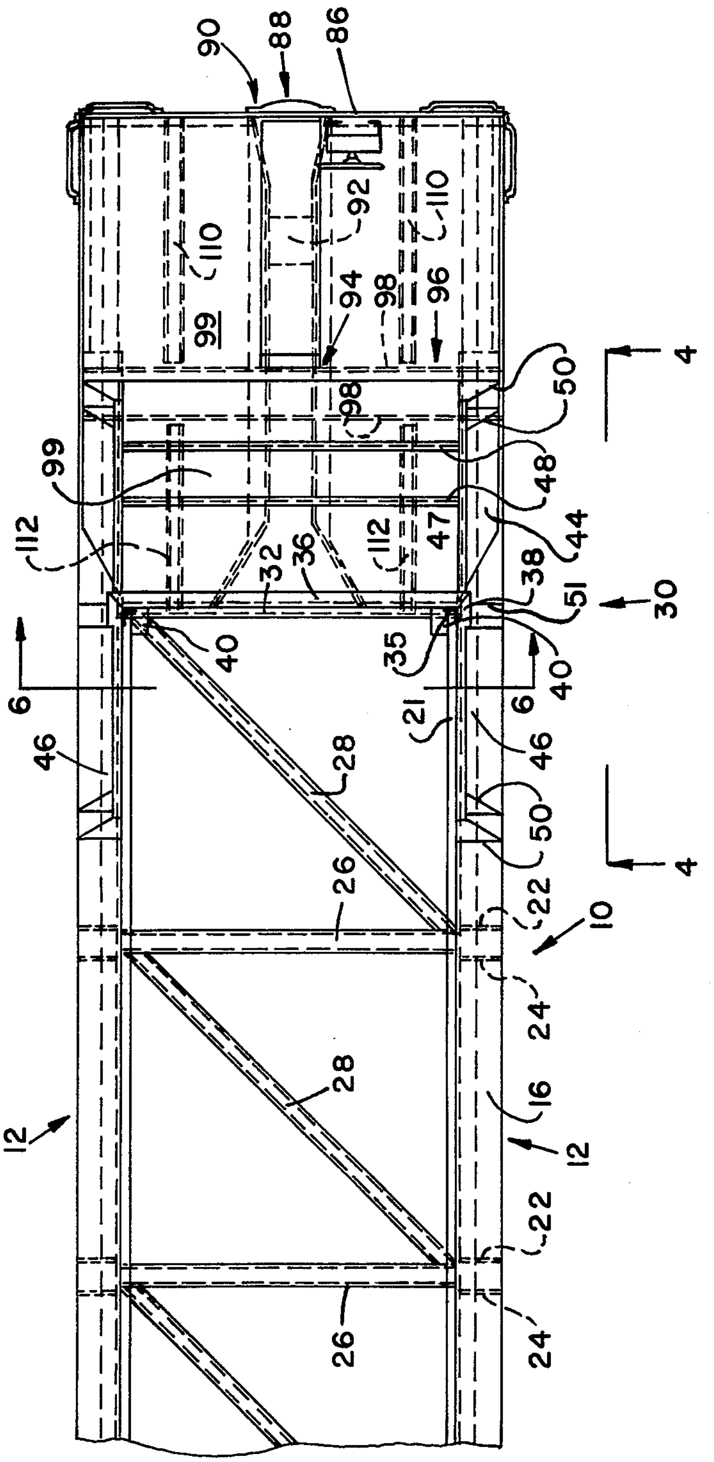
FIG. 1 is a plan view of one half of the container car of the present invention.
Figure 2:
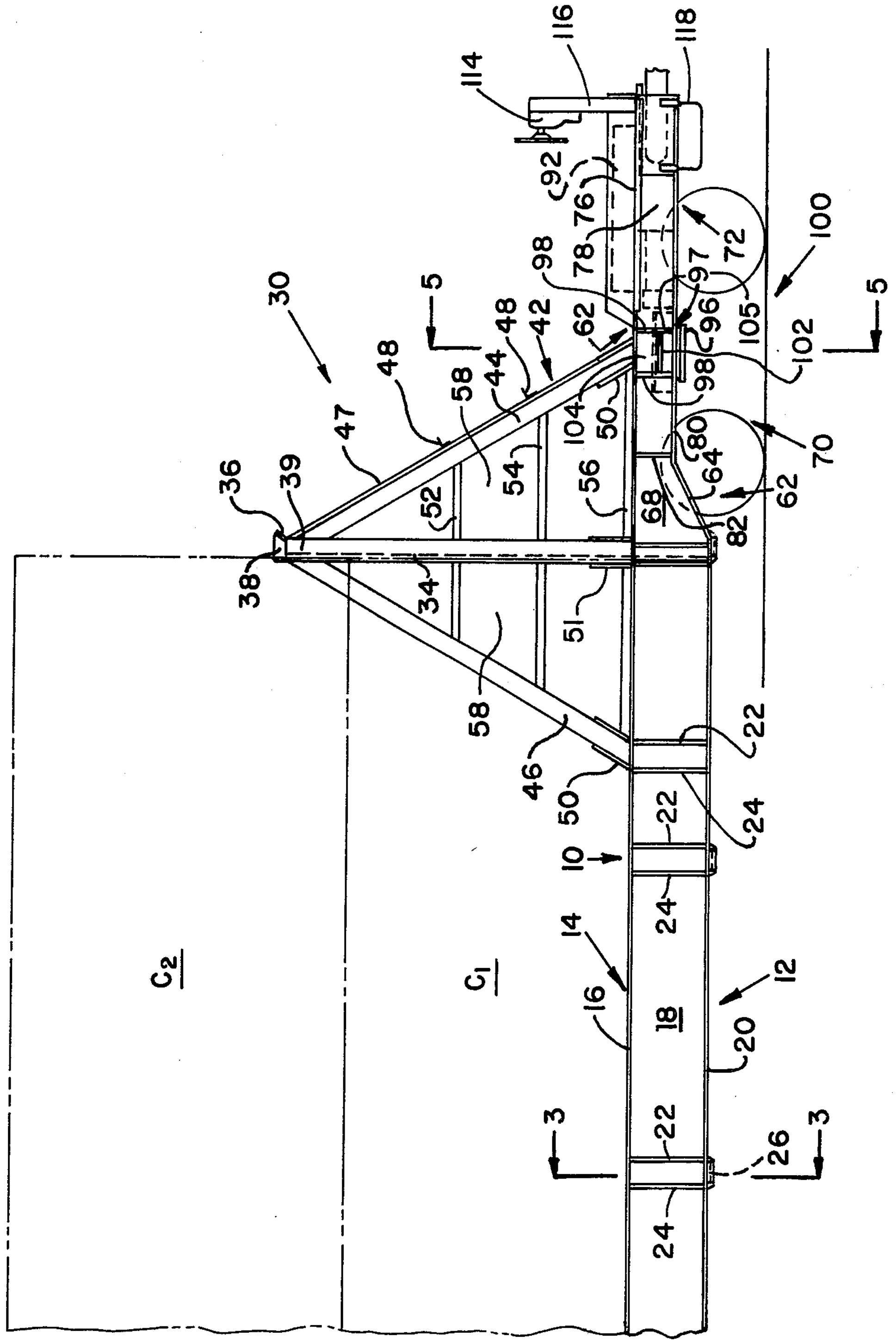
FIG. 2 is a side elevation view of one half of the container car of the present invention with upper and lower containers loaded thereon.
Figure 5:
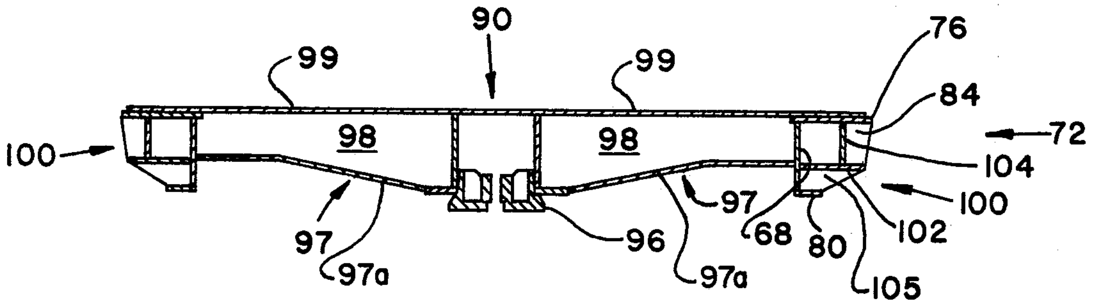
FIG. 5 is a sectional view looking in the direction of the arrow along the line 5—5 in FIG. 2.

The end portion of the car is indicated generally at 70. The end portion of the car includes a side sill 72 having an upper flange 76, a web portion 78, and a lower flange 80. Transversely extending gussets 82 (FIG. 2) are also provided. End portion side sill 72 joins an end sill 86 at the end of the car. End sill 86 includes an opening 88 into which is attached a stub center sill 90. A suitable draft gear 92 having rubber or hydraulic cushioning of known construction is mounted in stub sill 90. A center filler 94 of known construction including a depending center plate 96 is also mounted in stub sill 90. A transverse car body bolster 97 is provided for transmitting longitudinal impact and squeeze loads transmitted to draft gear 92 and center filler structure 94 transversely to end side sill 72. As shown in FIGS. 1, 2 and 5 this bolster structure 97 includes transversely extending webs 98, longitudinally spaced on either side of the center plate 94. A lower bolster cover plate 97*a* and an shear plate 99 are welded to vertical webs 98.

The side sill 72 is reinforced in the bolster area as indicated at 100. The reinforced side sill includes a reinforcing horizontal plate 102 and reinforcing vertical plates 104 and 105.

Longitudinal stringers 110 (FIG. 1) are welded to shear plate 99 to reinforce the end sill and transfer longitudinal loads from the end sill into the bolster structure 97. Similarly stringers 112 (FIG. 1) are provided to reinforce the body bolster 97 and transfer some longitudinal loads from the bolster into the bulkhead structure 30.

A conventional hand brake 114 having hand brake supports 116 is mounted on the end of the car. A suitable conventional stepladder 118 may also be provided.

In the operation of the container car of the present invention, lower containers $C_1$ to be transported are loaded vertically with a crane and are guided into the depressed center section by inclined plate 36 and longitudinal portion 38, and are supported on plates 40. An upper container $C_2$ is placed upon the lower container. The upper container is maintained in place by means of transverse plate 32, angles 35 and diagonals (FIGS. 1, 2, 4 and 6) 46.

The container loads received by the upper portion of transverse bulkhead 32 are transmitted downwardly into the side sills 12 and 72 by means of vertical beams 34 and diagonals 44 and 46, and into shear plate 99 through transverse inclined plate 47.

Impact loads are transmitted from draft gear 92 into center filler 94. From here the longitudinal loads divide. A component of the longitudinal load is transmitted up inclined plate 47 and into the upper portion of bulkhead plate 32. That portion of the load received in the mid portion of plate 32 is then transmitted transversely through plate 32 to vertical channel 34 and then downwardly through vertical beams 34 and diagonals 46 into side sills 12. The remaining longitudinal load is transmitted transversely by means of lower cover plate 97, vertical web 98, and shear plate 99 into reinforced side sill 100. This load then divides, part is carried by the end side sill 72 through transition side sill 62 and into main side sill 12. Part is transmitted upwardly through diagonal 44 and into vertical channel 34 and plate 32. From here this portion of the load is transmitted downwardly through beams 34 and diagonals 46 into side sill. Thus the bulkhead 32 structure 30 not only transfer container loads, but also, longitudinal impact and squeeze loads.

Side sill 12 is easy to fabricate since it is simple in design including only a channel section and a plurality of longitudinally spaced gussets.

The upper containers are maintained in place by means of the bulkhead plate 32, angles 35 and diagonals 46 (FIGS. 2, 4, and 6), thus eliminating the need for special locking means for maintaining the upper containers in place.

It will be apparent to those skilled in the art that more than two stacked containers may be transported in the railway car of the present invention, and that non-stacked containers may also be transported. It will also be apparent to those skilled in the art that other bulk lading in addition to containers can be transported.

While the side sill has been illustrated and described as a channel section, other load carrying structural shapes may be used for the side sill. For example the side sill may be composed of angles welded to a vertically extending web portion or a vertically extending box section may be utilized.

Furthermore while the transverse bulkhead has been illustrated as composed of a transverse plate it could also be composed of a different structural shape such as diagonals or a truss structure with an upper chord utilized to maintain the upper portion of the lading in place, if such upper support is necessary for the bulk lading being transported.

What is claimed:

1. A railway car comprising:

longitudinally spaced car end portions located at opposite ends of the car, including a stub sill and a transversely extending car body bolster; vertically extending side sills transversely spaced on opposite sides of the car extending longitudinally of the car and connected at opposite ends to said car end portions; longitudinally spaced transverse bulkheads extending transversely across the car attached to the inner ends of said car end portions, and extending vertically above said end portions; lading support means attached to the lower end portions of said side sills and to said transverse bulkheads; transversely spaced end side sills, foreshortened relative to said side sills, attached to said side sills and extending outwardly along each end portion of the car outboard of said transverse bulkhead; said side sills, transverse bulkheads and lading support means defining a depressed center section in said car; and bulkhead supports including transversely spaced first support members joining said side sill with the upper portion of said bulkhead, and at least one second support member joining the upper portion of said bulkhead and said car end portion; said bulkhead supports transmitting at least a portion of the lading loads downwardly respectively into said side sill and into said car end portion, and transmitting at least a portion of the longitudinal coupler loads applied to the end portion of the car upwardly into said transverse bulkhead and then downwardly into said side sill.

2. A railway car according to claim 1 wherein said side sill comprises a channel section having a plurality of longitudinally spaced transversely extending gussets attached thereto.

3. A railway car according to claim 1 wherein said second support member comprises a pair of transversely spaced diagonal members joining said end side sill and the upper portion of said bulkhead.

4. A railway car according to claim 1 wherein said second support member comprises an inclined transverse member attached to the upper portion of said transverse bulkhead and to said end portion of the car.

5. A railway car comprising:

longitudinally spaced car end portions located at opposite ends of the car, including a stub sill and a transversely extending car body bolster; vertically extending side sills transversely spaced on opposite sides of the car extending longitudinally of the car and connected at opposite ends to said car end portions; longitudinally spaced transverse bulkheads extending transversely across the car attached to the inner ends of said car end portions, and extending vertically above said end portions; lading support means attached to the lower end portions of said side sills and to said transverse bulkheads; transversely spaced end side sills, attached to said side sills and extending outwardly along each end portion of the car outboard of said transverse bulkhead; said side sills, transverse bulkheads and lading support means defining a depressed center section in said car; and bulkhead supports including transversely spaced first diagonal members joining said side sill with the upper portion of said bulkhead, a pair of second diagonal members joining said end side sills and the upper portion of said bulkhead; and an inclined transverse member extending from the upper portion of said transverse bulkhead to said car end portion, and attached to said second diagonal members; said bulkhead supports transmitting lading loads downwardly respectively into said side sill and into said car end section, and transmitting at least a portion of the longitudinal coupler loads applied to the end portion of the car upwardly into said transverse bulkhead and then downwardly into said side sill.

6. A container car according to claim 5 wherein said side sill includes a channel section having a plurality of longitudinally spaced transversely extending gussets attached to said channel section.

7. A container car according to claim 6 wherein said channel section comprises upper and lower flanges and in which the flanges are of unequal transverse length.

8. A container car according to claim 7 wherein the upper flange is of greater transverse length.

9. A container car according to claim 6 wherein said end side sill is foreshortened with respect to said side sill.

10. A container car according to claim 9 wherein lower reinforcing members are provided which extend transversely between said side sills and which reinforcing members join said side sills in the vicinity of at least one of said transverse gussets.

11. A container car according to claim 10 wherein lower diagonal members join said side sills and wherein said diagonals join said side sill respectively at locations where at least one of said transverse gussets is located.

12. A container car according to claim 9 wherein said end sill includes a channel section having at least one transversely extending gusset attached to said channel section.

13. A container car according to claim 12 wherein said end side sill is reinforced in the area of the body bolster.

14. A container car according to claim 12 wherein between said side sill and said end side sill said car includes a transition side sill.

15. A container car according to claim 14 wherein said transition side sill includes a channel section having a vertically inclined lower flange and a vertically inclined web portion.

16. A container car according to claim 5 wherein vertically extending beams are attached to opposite ends of said bulkhead and wherein said longitudinally extending diagonals are attached to the upper portion of said beams.

17. A container car according to claim 16 wherein said beams and said diagonals are channel shaped.

18. A railway car according to claim 16 including transversely spaced vertically extending angles joining said side sill and the upper portion of said bulkhead.

19. A container car according to claim 16 wherein longitudinally extending reinforcing means are provided which join said diagonals with said beams.

20. A container car according to claim 19 wherein said bulkhead reinforcing means includes at least one longitudinally extending vertical web.

21. A container car according to claim 5 wherein said inclined transverse plate is provided with inclined transverse plate reinforcing means.

22. A container car according to claim 21 wherein said transverse plate reinforcing means includes at least one transversely extending angle.

23. A railway car comprising:

longitudinally spaced car end portions located at opposite ends of the car, including a stub sill and a transversely extending car body bolster; vertically extending channel shaped side sills transversely spaced on opposite sides of the car extending longitudinally of the car and connected at opposite ends to said car end portions; longitudinally spaced transverse bulkheads extending transversely across the car attached to the inner ends of said car end portions, and extending vertically above said end portions; lading support plates attached to the lower end portions of said side sills and to said transverse bulkheads; transversely spaced end side sills, foreshortened relative to said side sills, attached to said side sills and extending outwardly along each end portion of the car outboard of said transverse bulkhead; said side sills and transverse bulkheads and lading support plates defining a depressed center section in said car; and bulkhead supports including transversely spaced first diagonal members joining said side sill with the upper portion of said bulkhead; vertical beams joining said side sills and said transverse bulkhead; a pair of second diagonal members joining said end side sills and the upper portion of said bulkhead; a transverse plate extending from the upper portion of said bulkhead to said car end portion and attached to said second diagonal members; said bulkhead supports transmitting at least a portion of the lading loads downwardly respectively into said side sill and into said car end section, and transmitting at least a portion of the longitudinal coupler loads applied to the end portion of the car upwardly through said transverse plate and said second diagonals into said transverse bulkhead then downwardly through said vertical beams into said side sills and downwardly through said transverse bulkhead and through first diagonal members into said side sill.

* * * * *

UNITED STATES PATENT AND TRADEMARK OFFICE

CERTIFICATE OF CORRECTION

PATENT NO. : 4,091,742

DATED : May 30, 1978

INVENTOR(S) : Eugene J. Cordani

It is certified that error appears in the above-identified patent and that said Letters Patent are hereby corrected as shown below:

Patent is assigned to ACF Industries, Incorporated, New York, N. Y., and Assignee should thus be shown.

Attorney of record is Henry W. Cummings, and Attorney should thus be shown.

Col. 2, line 10, delete "a" after "includes".

Col. 3, line 55, delete "32" after "bulkhead".

Signed and Sealed this

*Fourteenth* Day of *November 1978*

[SEAL]

*Attest:*

RUTH C. MASON
*Attesting Officer*

DONALD W. BANNER
*Commissioner of Patents and Trademarks*